March 8, 1938. H. W. MITCHELL 2,110,450
HYDROMETER
Filed Aug. 15, 1936
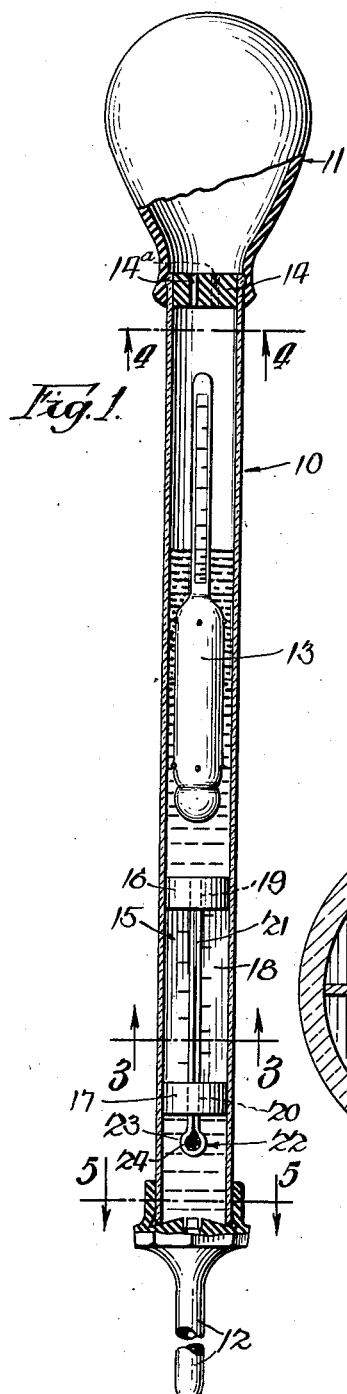
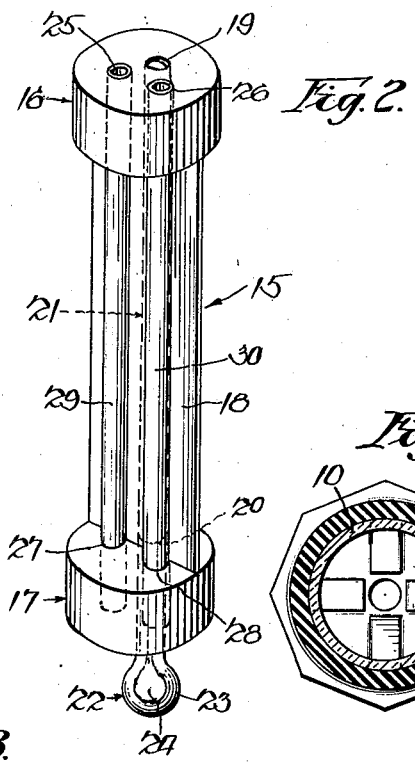
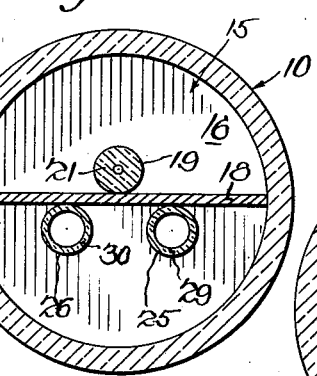
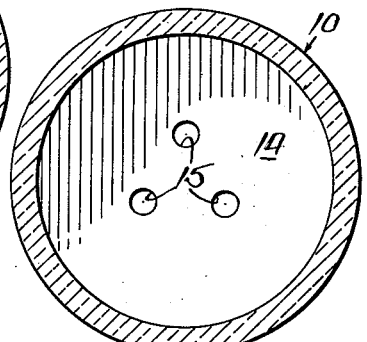
Inventor:
Henry Walter Mitchell Patented Mar. 8, 1938

REISSUED

DEC 3 1940

2,110,450

UNITED STATES PATENT OFFICE 2,110,450

HYDROMETER

Henry Walter Mitchell, Chicago, Ill., assignor to Emil A. Stromberg, Chicago, Ill.

Application August 15, 1936, Serial No. 96,183

9 Claims. (Cl. 265—46)

This invention relates to measuring instruments of the hydrometer type and more particularly to a thermo-hydrometer.

Heretofore, thermometers have been employed in testing liquids with a hydrometer, and the thermometer was attached or built outwardly of the body of the hydrometer.

It is an object of the present invention to combine a thermometer within the body of a hydrometer for simultaneously testing the specific gravity and temperature of a liquid, and wherein the scale of the thermometer is not contacted by the liquid being tested.

Another object is to provide a thermometer within the body of the hydrometer, arranged and constructed so as to permit of the passage of the liquid to the upper end of the hydrometer to be checked for specific gravity by means normally employed in the hydrometer.

A further object is the provision of a unit containing a thermometer which has one end thereof adapted to extend outwardly of the unit and to be contacted by the liquid, when a test is being made, and the stem of which thermometer is aligned with a scale, and the unit being provided with a plurality of passage-ways, so that, when the unit is positioned within the body of the hydrometer, the stem and scale of the thermometer will be sealed from contact with the liquid being tested, while the liquid is permitted to flow through the passage-ways of the unit.

And a further object is the provision of a thermometer positioned below the usual float of the hydrometer to record the temperature of the liquid under test immediately upon entering the hydrometer.

In accordance with the present invention, it is proposed to frictionally secure the thermometer unit within the body of the hydrometer below the float thereof whereby the stem of the thermometer and a scale carried to coact therewith will be insulated from contact with the liquid to be tested, and in which unit there are passage-ways permitting of the free passage of liquid from the lower portion of the hydrometer to the upper portion thereof. If a liquid is not transparent, it may be readily tested as to its specific gravity and temperature without interfering with the visibility of the thermometer therein.

While I have shown the unit as being frictionally applied within the body of the hydrometer, it is to be understood that the same may be molded or otherwise retained therein.

Referring to the drawing:

Figure 1 illustrates a longitudinal cross-sectional view of a hydrometer having my invention applied thereto, and the bulb end and the lower stem of the hydrometer partially in elevation.

Figure 2 is a detail perspective view of the thermometer unit to be applied within the body of the hydrometer.

Figure 3 is an enlarged detail cross-sectional view taken through the thermometer on the line 3—3 of Figure 1.

Figure 4 is an enlarged detail cross-sectional view taken through the upper portion of the hydrometer on the line 4—4 of Figure 1; and Figure 5 is a detail cross-sectional view taken on the line 5—5 of Figure 1.

The reference numeral 10 designates the transparent tubular body portion of the hydrometer, which is provided with the usual suction bulb 11 at the upper end thereof, and with a receiving spout 12 at the lower end thereof. The body portion 10 of the hydrometer carries the usual float 13 therein for testing the specific gravity of the liquid to be tested, and this body portion 10 has a rubber plug 14 at the upper end thereof that is provided with a plurality of openings 14a therein to permit of the passage of air while the hydrometer is in use, and the plug serving as a stop to limit the upward movement of the float 13.

The thermometer, comprising the subject matter of this invention, is arranged as a unit designated as a whole as 15, is bodily positioned in near the lower end of the body portion 10 of the hydrometer, and the upper end of which unit serves with the plug 14 to limit the vertical movements of the float 13 within the hydrometer.

The unit 15 comprises an upper and lower plug 16 and 17, respectively, arranged in spaced relation and having a graduated scale 18 therebetween. The upper and lower plugs 16 and 17 are preferably of resilient material, and are each provided with an opening 19 and 20, which are arranged in aligned relation to receive a stem 21 of a thermometer 22, having the usual bulb end 23, provided with mercury 24.

The plug 16 is also provided with a pair of openings 25 and 26 which are aligned with a pair of openings 27 and 28 in the lower plug 17, and which openings are positioned rearwardly of the scale 18 and receive a pair of aligned tubular members 29 and 30 therein, and when positioned, these tubular members 29 and 30 serve with the thermometer stem 21 to retain the scale 18 therebetween and readily readable with the thermometer.

When the unit is assembled as above described, (Fig. 2), it is then inserted within the transparent tubular body portion 10 of the hydrometer, and the plugs 16 and 17 thereof serve to seal the same in position with the bulb end 23 of the thermometer exposed to the liquid.

As a test is being made, the bulb 11 is collapsed and the thermometer is positioned with the spout 12 thereof within the liquid, and as the bulb is released, the suction created thereby will draw into the hydrometer a sufficient amount of liquid to make the test. As the liquid enters into the body portion 10 of the hydrometer, it immediately contacts the bulb 23 of the thermometer and is drawn upwardly through the tubular members 29 and 30 into contact with the float 13 positioned above the plug 19 of the unit. When the liquid is within the body portion of the hydrometer, as above described, the gauge 18 and the thermometer stem 21 will be readily visible, as the liquid does not contact the same, and it is then a simple matter to readily determine the degree of temperature of the liquid as well as the specific gravity thereof indicated by the gauge float 13.

I contemplate as being included in these improvements all such changes, variations and departures as fall within the scope of the appended claims.

I claim:

1. In a device of the class described, having a tubular transparent body and a float arranged for vertical movements therein, of a unit arranged to fit within said body below the float therein, said unit forming a fluid-tight partition in said body, temperature indicating means in said unit having the bulb element projecting beyond said unit for exposure to the fluid under test, and passage-ways in said unit communicating with the upper and lower ends of said body forming means for the admission of a liquid therethrough to be indicated by the temperature indicating means.

2. In a device of the class described having a tubular transparent body and a float arranged for vertical movements therein, of a unit arranged within said body below the float therein and comprising spaced fluid-tight partition portions in said body, said unit comprising temperature indicating means and a plurality of passage-ways therein communicating with each end of the tubular transparent body, said passage-ways forming means for conducting a liquid under test in close proximity with the temperature indicating means.

3. In a hydrometer of the character described, a hydrometer barrel, a thermometer having a recording stem and a bulb end thereon and being positioned within and at near the lower end portion of said barrel, and passage-ways therearound permitting the flow of liquid therethrough into the barrel, and means for sealing the recording zone of said thermometer from contact with the liquid tested while permitting the bulb end thereof to be contacted thereby.

4. A unit adapted to be positioned within a hydrometer, comprising resilient upper and lower ends, a thermometer having a stem extending through said upper and lower resilient ends, a scale for said thermometer extending between said upper and lower resilient ends, and a plurality of tubular members forming passage-ways through said unit and serving with said thermometer to retain the scale in position.

5. A temperature indicator arranged as a unit having spaced partitioning elements and adapted to be bodily positioned within the body portion of a hydrometer, comprising, a thermometer supported longitudinally in said unit with the scale portion between said elements, a scale supported in said unit and adapted to record the temperature subjected to the thermometer, tubular members extending through said unit and forming passage-ways therethrough, said tubular members being in close proximity with the thermometer to impart the temperature of the liquid thereto.

6. In a device of the class described, having a tubular transparent body and the usual gauge float arranged for vertical movements therein, of a temperature recording unit arranged to fit within said body below the float therein and forming spaced partitions in said body, said temperature recording unit comprising, a thermometer having a scale coacting therewith, passage-ways for a liquid to be tested extending through said unit and in close proximity with the thermometer, and means at each end of the unit for sealing the same against contact with the liquid to be tested.

7. Temperature indicating means adapted for use in a hydrometer, comprising, a thermometer, partitioning means for supporting said thermometer substantially centrally of the body of the hydrometer at near one end thereof with the scale thereof between said partitioning means, and a plurality of passage-ways extending parallel with and in close proximity with the thermometer and communicating with the upper and lower ends of the hydrometer forming means for a liquid to be tested to pass said thermometer, while being drawn into the upper end of the hydrometer.

8. In a device of the class described, having a tubular transparent body and the usual gauge float arranged for vertical movements therein, of a temperature recording unit having spaced partitioning elements arranged to fit within said body below the float therein and to form a liquid-tight partition in said body, said temperature recording unit comprising a thermometer having a scale coacting therewith, and passage-ways extending between said partitioning elements and communicating with the upper and lower ends of said tubular body forming means for the admission of a liquid therethrough from the lower portion of said body to the upper portion thereof to be indicated by the temperature recording means.

9. A temperature indicating means adapted to be positioned within the barrel of a hydrometer, comprising, a unit having spaced partitioning elements and a thermometer and scale therebetween, and tubular members extending through said partitioning elements forming passage-ways through which a liquid drawn within the hydrometer may pass to the upper portion thereof, said passage-ways being arranged to guide the liquid in close proximity with the thermometer to record the temperature thereof, the barrel of the hydrometer forming a shield to protect the thermometer from atmospheric changes.

HENRY WALTER MITCHELL.